United States Patent [19]

Rypka

[11] Patent Number: 5,067,694

[45] Date of Patent: Nov. 26, 1991

[54] AUTOMATIC COUPLING SYSTEM

[75] Inventor: Dann B. Rypka, Owatonna, Minn.

[73] Assignee: Owatonna Tool Company, Owatonna, Minn.

[21] Appl. No.: 545,751

[22] Filed: Jun. 28, 1990

Related U.S. Application Data

[63] Continuation of Ser. No. 194,329, May 16, 1988, abandoned.

[51] Int. Cl.[5] .............................................. B23Q 3/00
[52] U.S. Cl. ...................................... 269/20; 269/27; 269/55
[58] Field of Search ...................... 269/20, 24, 27, 55, 269/56, 58, 309, 329, 900; 198/345; 403/348, 349; 29/563, 564; 414/225, 280

[56] References Cited

U.S. PATENT DOCUMENTS

| | | |
|---|---|---|
| 3,854,889 | 12/1974 | Lemelson .............................. 29/33 P |
| 4,506,441 | 4/1985 | Yamanaga et al. ..................... 29/787 |
| 4,669,161 | 6/1987 | Sekelsky, Jr. .......................... 29/33 |
| 4,671,728 | 6/1987 | Clark et al. ........................... 414/401 |

OTHER PUBLICATIONS

Catalog-Carr Lane Roemheld Mfg. Co., pp. 58 and 59.

*Primary Examiner*—J. J. Hartman
*Attorney, Agent, or Firm*—Wood, Phillips, Mason, Recktenwald & Van Santen

[57] ABSTRACT

An automated machining center performs various operations on a work piece which is locked onto the pallet using a hydraulically operable fixture. An automatic coupling system according to the invention provides for automatic coupling between the pallet and a source of hydraulic power to selectively lock or release the work piece on the pallet. The coupling system includes a cam ring associated with the pallet in axial alignment with a rotatable locking rod associated with a base unit. The locking rod is axially mounted to a dual acting hydraulic cylinder itself axially mounted to a carriage which is moveable relative to the base unit. Alternate extension and retraction of the cylinder causes the locking rod to selectively engage the cam ring to draw the carriage towards the pallet to provide automatic coupling between quick coupler sockets on the carriage and quick plug couplers on the pallet to provide a fluid communication line between a source of power and the hydraulic fixture. Subsequent linear movement of the locking rod results in rotation thereof by the cam ring for decoupling of the quick coupler socket and plug.

17 Claims, 10 Drawing Sheets

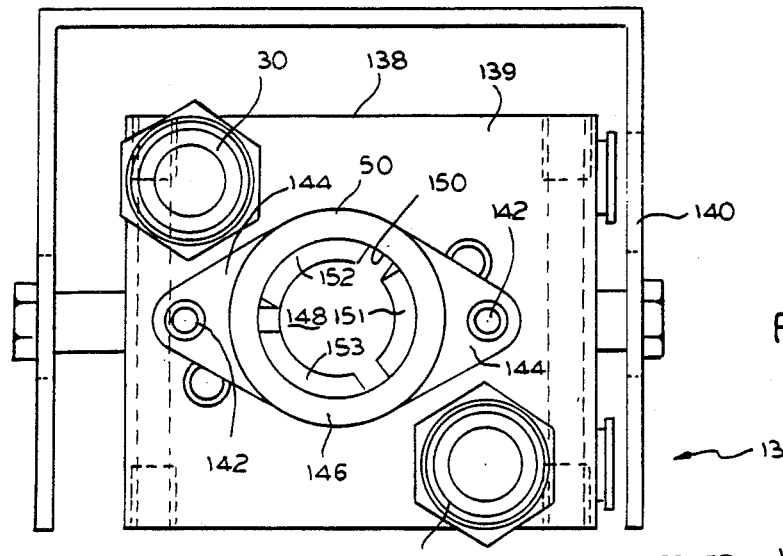
FIG. 8
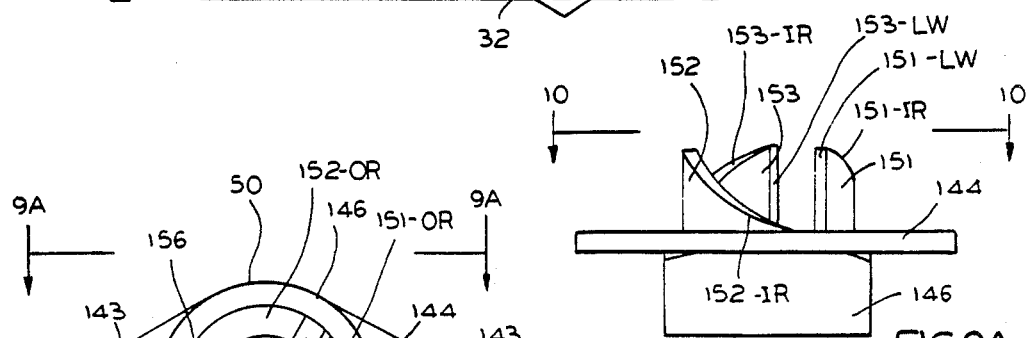
FIG. 9A
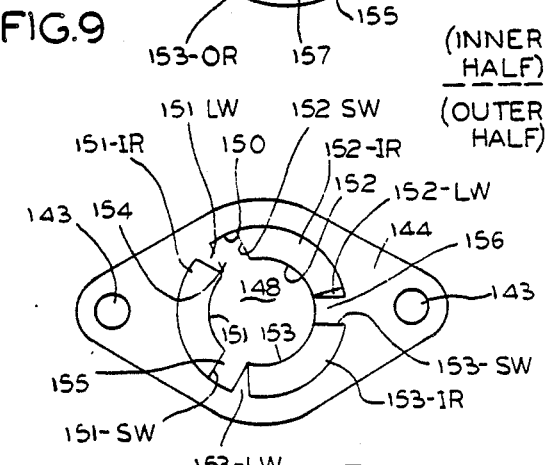
FIG. 9
FIG. 10
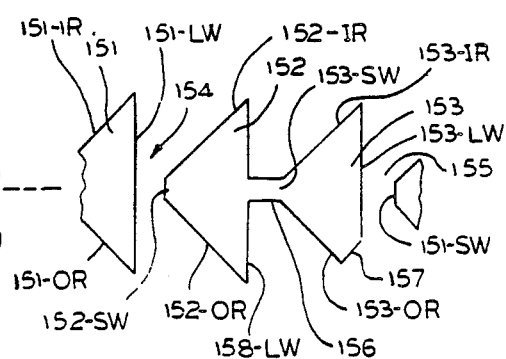
FIG. 11

AUTOMATIC COUPLING SYSTEM

This application is a continuation, of application Ser. No. 194,329, filed May 16, 1988, now abandoned.

DESCRIPTION

1. Field of the Invention

This invention relates generally to coupling systems, and more particularly, to an automatic hydraulic coupling system.

2. Background of the Invention

Known machining centers perform various operations, such as milling and drilling, on a work piece. Such machining centers frequently use a pallet on which the work piece can be positioned to perform the desired operation. In a more automated machining center, two or more pallets are provided so that an operator can be exchanging a work piece on one pallet outside the machining center while work is being performed on a pallet-mounted work piece positioned in a machining location.

The pallet typically includes a fixture for mounting the work piece in a desired position and a clamp structure for locking the work piece in position. The clamping structure can be manually-operated. For example, a bolt may be provided which is respectively tightened or loosened to clamp or unclamp the work piece. However, such a manually-operated clamping fixture can result in non-uniform clamping of work pieces. Also, use of such a clamping fixture can be time consuming, which may place a limitation on productivity provided by the machining center.

Hydraulic clamping, which could also be used in a manually-operated system, lends itself to automation. Particularly, one known automatic coupling system includes matable quick disconnect fixtures respectively mounted to a pallet unit and a base unit. However, with such a system, the base unit and pallet unit must be moveable relative to one another in order to provide a suitable coupling therebetween. Accordingly, in addition to moving the pallets in and out of the machining center, the pallet must also be moved relative to the base unit, resulting in additional facilities required for such movement which might add cost to the overall system.

The present invention is intended to overcome these and other problems associated with coupling systems.

SUMMARY OF THE INVENTION

In accordance with the present invention, an automatic coupling system is provided which is operable to couple a base unit coupling device to a satellite unit coupling device utilizing a controllable reciprocally moveable connector element.

Broadly, there is disclosed herein a cam ring mounted to a satellite unit, the cam ring having a central axial opening surrounded by a plurality of helical cam portions at least two of which are interconnected. An elongated locking rod having a diameter smaller than the diameter of the central opening and a plurality of outwardly extending axially and circumferentially spaced locking pins is mounted to a carriage slideably mounted in a base unit. Control means are provided for sequentially reciprocally moving the carriage whereby reciprocal movement causes the rod to alternately pass inwardly and outwardly through the opening with the pins selectively engaging the cam portions causing the locking rod to rotate. Such rotation results in engagement of the rod with the cam ring to cause the carriage to slideably move towards or away from the satellite unit. Coupling devices mounted to the satellite unit are thus controllably coupled and subsequently uncoupled to mating coupling devices mounted in the base unit.

In a preferred embodiment of the invention, a coupling system is provided for a hydraulic work holding station including a hydraulically operable pallet fixture for clamping a work piece. The fixture includes an inlet port having a first quick connect hydraulic coupler in fluid communication therewith. A cam ring having a central axial opening therethrough which is surrounded by a plurality of helical cam portions is mounted to the fixture with the coupler and cam ring axes in parallel spaced relation.

A second quick connect coupler, matable with the first coupler, is in fluid communication with a source of hydraulic power. A dual acting air cylinder having an axial piston rod includes an elongated locking rod axially connected to the piston rod. The piston rod is free to rotate in the cylinder. The locking rod has a diameter smaller than the diameter of the cam ring central opening and a plurality of outwardly extending and axially and circumferentially spaced locking pins. The second coupler is mounted to a carriage which is moveable with respect to a base unit housing. The cylinder is also mounted to the carriage with the respective axes of the locking rod and second coupler being in parallel spaced relation identical to the spacing discussed above relative to the fixture.

The base unit housing is axially spaced from the fixture and includes sliding rods for axially slideably supporting the carriage so that the locking rod and second coupler are respectively axially aligned with the cam ring central opening and the first coupler.

A pneumatic control is coupled to the cylinder for alternately directing air to first and second cylinder chambers to reciprocate the piston rod. Reciprocal movement of the piston rod causes the locking rod to pass inwardly and outwardly through the cam ring central opening and further causes the rod pins to coact with the cam ring cam portions resulting in selective rotation of the locking rod. Engagement of the locking rod pins or a locking rod flange and portions of the cam ring, resulting from the rotation, holds the locking rod against movement and causes the carriage to selectively moved towards or away from the fixture to controllably mate the first and second couplers to provide a hydraulic connection between the source of hydraulic power and the fixture inlet port.

The coupling system is initiated with the cylinder in a retracted home position. When the cylinder is first extended, the locking rod approaches and thereafter inwardly passes through the cam ring opening whereby one of the helical cam portions is engaged by a locking rod pin to rotate the locking rod. Subsequently, the cylinder is retracted thereby causing a locking rod pin to engage another cam portion on the inner side of the cam ring resulting in additional rotation whereby the pin engages an interconnected cam portion to prevent further axial movement thereof Resultantly, air pressure acting in a direction to retract the cylinder results in the cylinder and thus the carriage being drawn towards the pallet fixture until the quick connect couplers are coupled to one another. Thereafter, the air cylinder is extended to release pressure on the couplers caused by the locking rod and cam ring. However, the connectors remain coupled so that the work piece can be unclamped by suitably directing hydraulic fluid to the fixture inlet port.

After a work piece has been changed, a clamp cycle is initiated whereby hydraulic fluid is suitably directed to the fixture inlet port to clamp the work piece in the fixture. Thereafter, the cylinder is retracted causing a pin to engage another cam surface and rotate the locking rod whereby the locking rod is free for retraction for withdrawal from the central opening, and the locking rod engages a release bracket mounted adjacent the second coupler to uncouple the first and second couplers as the locking rod retracts. Subsequently, the cylinder is extended causing a flange on the locking rod to contact the face of the cam ring so that further extension causes the carriage to be pushed back to its original home position. Finally, the air cylinder is retracted to return the locking rod into its initial position, ready for a subsequent coupling operation.

It is a further object of the present invention to provide an automatic coupling system utilizing a plurality of sensors to sense the various positions in the sequence.

In the preferred embodiment, the sensors include pressure sensors for sensing when the cylinder is in its full extended or retracted position, and proximity switches for sensing when the cylinder and its piston are in their home position, and the couplers are in a coupled condition.

It is another object of the present invention to provide an automatic coupling system utilizing a programmed control device to alternately extend and retract the cylinder responsive to inputs from the sensors.

Further features and advantages of the invention will readily be apparent from the specification and from the drawings.

BRIEF DESCRIPTION OF THE DRAWINGS

FIG. 8 is an elevational view of a coupling fixture forming a part of the pallet unit of FIG. 2;

FIG. 9 is a detailed view of the outer side of a cam ring of the coupling fixture of FIG. 8;

FIG. 9A is a plan view of the cam ring taken along the lines 9A—9A of FIG. 9;

FIG. 10 is a detailed view of the inner side of the cam ring taken along the lines 10—10 of FIG. 9A;

FIG. 11 is a radial sectional view taken relative to the radius of the central opening of the cam ring of FIG. 9;

DETAILED DESCRIPTION OF THE PREFERRED EMBODIMENT

Figure 1:
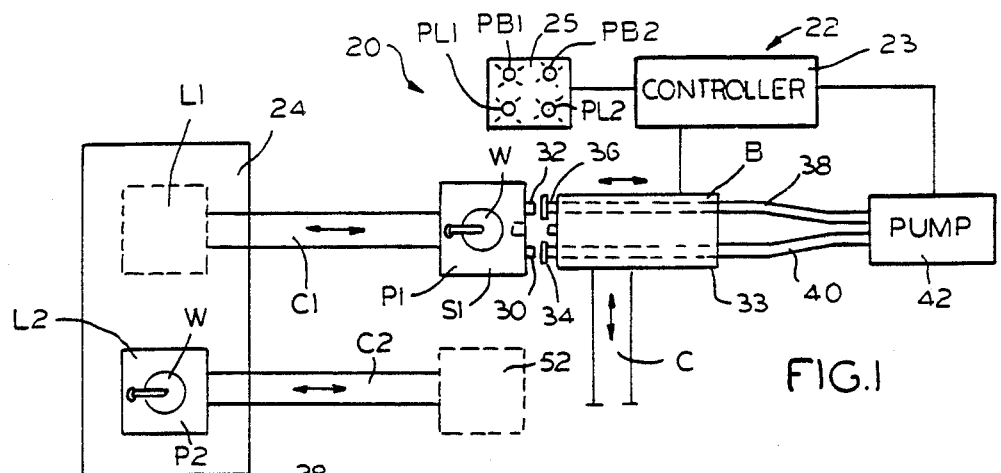
FIG. 1 is a generalized block diagram of a machining center utilizing a coupling system according to the invention.

With reference to FIG. 1, a typical two stage machining center 20 is illustrated including an automatic coupling system 22 according to the invention.

The illustrative machining center 20 includes a machining location 24 for a tool, such as a mill or drilling unit (not shown), which is provided for performing an operation on a work piece W mounted to a first or second pallet P1 or P2, respectively. The machining location 24 includes a first location L1 and a second location L2 at which the respective pallets P1 and P2 are positioned when a machining operation is to be performed. Respective conveying structures C1 and C2 provide for transfer of the pallets P1 or P2 between the machining locations L1 or L2 and a respective staging location S1 or S2. As is specifically illustrated in FIG. 1, the first pallet P1 is located at its associated staging location S1 so that the work piece W can be exchanged. The second pallet P2 is positioned in the machining center 24 at its associated machining location L2 for an operation to be performed thereon. When the operation on the work piece at the second location L2 is completed, the pallet P2 is moved across its conveyor C2 to the second staging location S2 so that the work piece W may be exchanged. At the same time, the first pallet P1 is transferred across its conveyor C1 to its associated machining location L1.

As will be appreciated, the particular arrangement for transferring respective pallets between machining and staging locations is well known in the art and does not perform part of the invention. Moreover, the automatic coupling system 22 according to the invention could be utilized in conjunction with a system which included more or less than 2 pallets, and/or machining locations, and/or staging locations.

Figure 2:
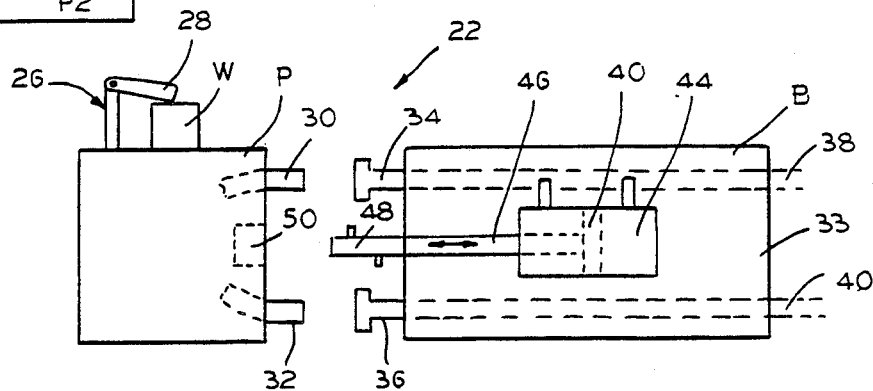
FIG. 2 generally illustrates a base unit and pallet unit for the coupling system of FIG. 1.

With reference also to FIG. 2, the automatic coupling system 22 is utilized in conjunction with a hydraulically operable fixture 26 mounted to the pallet unit P. (For purposes of simplicity herein, the suffixes 1 or 2 utilized with reference to FIG. 1 will not be referred to hereinafter as each pallet unit is essentially identical). The fixture 26 includes a clamping element 28 for locking the work piece W in position on the pallet unit P. First and second plug couplers 30 and 32 respectively, are connected to the fixture 26, as described below, to selectively direct hydraulic fluid to lock or release the clamp 28. A cam ring 50 is mounted to the pallet unit P in axial spaced parallel relation with the couplers 30 and 32.

An elongated base unit B has a housing 33. The base unit B is mounted to a conveying unit C. The base unit B is movable on the conveying unit C in any known manner between respective positions which are in axial alignment with the staging position S1 and S2. The base unit B includes first and second couplers 34 and 36. Particularly, the first plug coupler 30 is matable with the first socket coupler 34, and the second plug coupler 32 is matable with the second socket coupler 36. The couplers comprise quick couplers, such as illustrated in the OTC Division catalog No. H-8401 at page 37, which is incorporated by reference herein. With such devices, a hydraulic coupling is provided by inserting the plug coupler into the socket coupler. Upon such a coupling being made, a collar on the socket coupler is automatically moved axially towards the plug coupler. Release is effected by moving such collar axially away from the plug coupler to thereby automatically release the plug coupler from the socket. The first socket coupler 34 includes a collar 34C and the second socket coupler 36 includes a collar 36C. Each of the base unit socket couplers 34 and 36 is in fluid communication via respective first and second hoses 38 and 40 to a hydraulic pump 42. A dual acting air cylinder 44 having a piston 47 and a piston rod 46 is movably mounted, as is discussed in more detail below, in the base unit B for longitudinal movement therein. The piston 47 is free to rotate within the cylinder 44. Also, the couplers 34 and 36 are movable with the cylinder 44. An elongated locking rod 48 is attached at an outer end of the shaft 46 for movement therewith.

The pump 42 and cylinder 44 are controlled, as is discussed in greater detail below, by a controller 23. The controller 23 is connected to a control panel 25 having an unclamp push button PB1 which is actuated in order to initiate a couple/unclamp operation. An unclamp pilot light PL1 is illuminated when this operation is completed. Similarly, a clamp push button PB2 is actuated in order to initiate a clamp/uncouple operation, while a clamp pilot light PL2 is illuminated when this operation is completed.

Although the automatic coupling system 22 disclosed herein utilizes push buttons and pilot lights in a manual type operation, the control panel 25 could be eliminated or supplemented in a more automated system wherein a robot is utilized to change the work piece W. Specifically, the machining center could sense by using any conventional means (not shown), which such means do not form part of the invention but are referred to for background information only, when pallet unit P is in a staging location S requiring that a work piece be exchanged. Accordingly, the couple/unclamp command could be automatically given to the controller 23 which would initiate the operation. The completion of the couple/unclamp operation would provide a signal from the controller 23 to the robot to exchange the work piece. When the robot completed exchanging the work piece, the robot would initiate a clamp/uncouple operation command to the controller 23. When the clamping/uncoupling operation is completed, the controller 23 would signal the maching center to initiate a machining cycle.

The controller 23 is operable, as is discussed more specifically below, to alternately cause extension and retraction the cylinder piston 47. Since the shaft 46 connects the locking rod 48 to the piston 47, such extension and retraction causes the locking rod 48 to axially move inwardly and outwardly relative to the cam ring. Selective engagement between the cam ring and the locking rod causes the base unit socket couplers 34 and 36 to move longitudinally toward their associated respective plug couplers 30 and 32 to the pallet unit P to alternately couple and uncouple the respective pairs.

Figure 3:
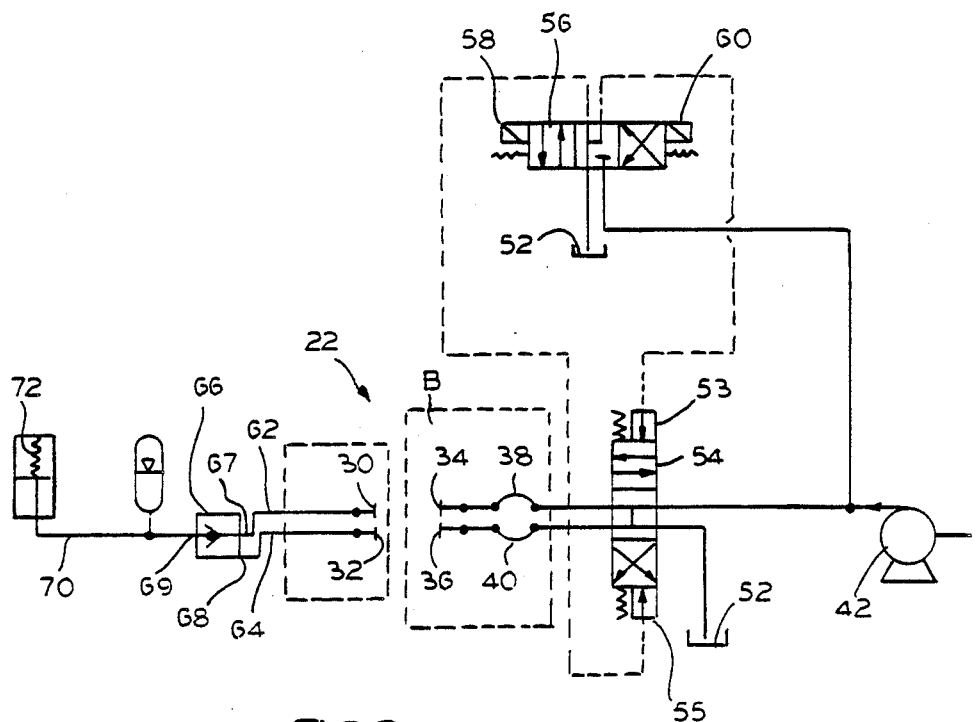
FIG. 3 is a hydraulic schematic diagram for the coupling system of FIG. 1.

An overall hydraulic schematic of a typical hydraulic work holding station for a machining center is illustrated with reference to FIG. 3. The pump 42 and a tank 52 are hydraulically connected to the input side of a normally closed hydraulic solenoid operated 4-way control valve 54. The output side is connected to the first and second hydraulic hoses 38 and 40, discussed above. The control valve 54 includes respective first and second hydraulic pilot pistons 53 and 55. When the first hydraulic pilot pistons 53 is actuated, the pump 42 is connected with the first hose 38 and the tank 52 is connected with the second hose 40. When the second hydraulic pilot pistons 55 is actuated, the pump 42 is hydraulically connected to the second hose 40 while the first hose 38 is connected with the tank 52. The pump 42 and tank 52 are also connected to the input side of an electrical solenoid operated 4-way pilot valve 56. The pilot valve 56 includes first and second electrical solenoids 58 and 60, respectively. The output side of the pilot valve 56 is connected to the pilot pistons 53 and 55 of the control valve 54.

If neither solenoid 58 or 60 is energized, the hydraulic pilot pistons 53 and 55 of the control valve 54 are connected to the tank 52 and no hydraulic fluid is directed through either hose 38 or 40. If the first solenoid 58 is energized, then the pilot valve 56 directs flow from the pump 42 to the first hydraulic pilot piston 53 so that hydraulic fluid is directed from the pump 42 through the first hydraulic hose 38, the second hydraulic hose 40 being a return line to the tank 52. Conversely, if the second solenoid 60 is energized, then hydraulic fluid is directed from the pump 42 through the pilot valve 56 to the second hydraulic pilot piston 55 of the control valve 54. Accordingly, hydraulic fluid from the pump 42 is directed through the second hydraulic hose 40, while the first hydraulic hose 38 is connected to the tank 52.

The fixture 26 of the pallet P, see FIG. 2, may utilize a variety of different hydraulic circuits to control the clamping element 28. One typical circuit is illustrated in FIG. 3. Specifically, the couplers 30 and 32 have respective hydraulic hoses 62 and 64 connected thereto. A pilot operated check valve assembly 66 includes first, second and third ports, 67–69, respectively. The first port 67 is connected to the first hydraulic hose 62, the second port is connected to the second hydraulic hose 64, and the third port 69 is connected to a third hydraulic hose 70. The third hydraulic hose 70 is connected to a spring return single acting hydraulic cylinder 72. The cylinder 72 operates the clamping element 28 in a conventional manner. In the illustrative example, when hydraulic pressure is provided to the cylinder 72 the clamping element 28 locks the work piece in place. Conversely, when pressure is released from the hose 70, the clamping element 28 releases the work piece W to unclamp same. The check valve 66 is operable to pressurize the third port 69 when a suitable hydraulic pressure is applied to the first port of 67. Pressure at the third port 69 is released by pressurizing the second port 68.

In operation, when the coupler pairs 34 and 30, and 36 and 32 are coupled and the first solenoid 58 is energized, the pump 42 is connected through the hydraulic hoses 38 and 62, to the check valve first port 67 to pressurize the third port 69, causing the cylinder 72 to operate the clamping element 28 to lock the work piece W. Conversely, when the second solenoid 60 is energized, the pump 42 is connected through the hydraulic hoses 40 and 64 to the second port 68 of the check valve 66 to release pressure at the third port 69, causing the cylinder 72 to return by spring bias to its normal state resulting in the clamping element 28 releasing the work piece W. Accordingly, the first solenoid 58 serves as a control to clamp the work piece W while the second solenoid 60 serves as a control to unclamp the work piece W.

Although the coupling system 22 is illustrated having a single acting component mounted in the pallet unit, double acting components, or a combination of single acting and double acting components could be utilized in conjunction with the check valve 66 to operate the clamping element 28, by suitably connecting the second side of the double acting components to the second hydraulic hose 64.

Figure 4:
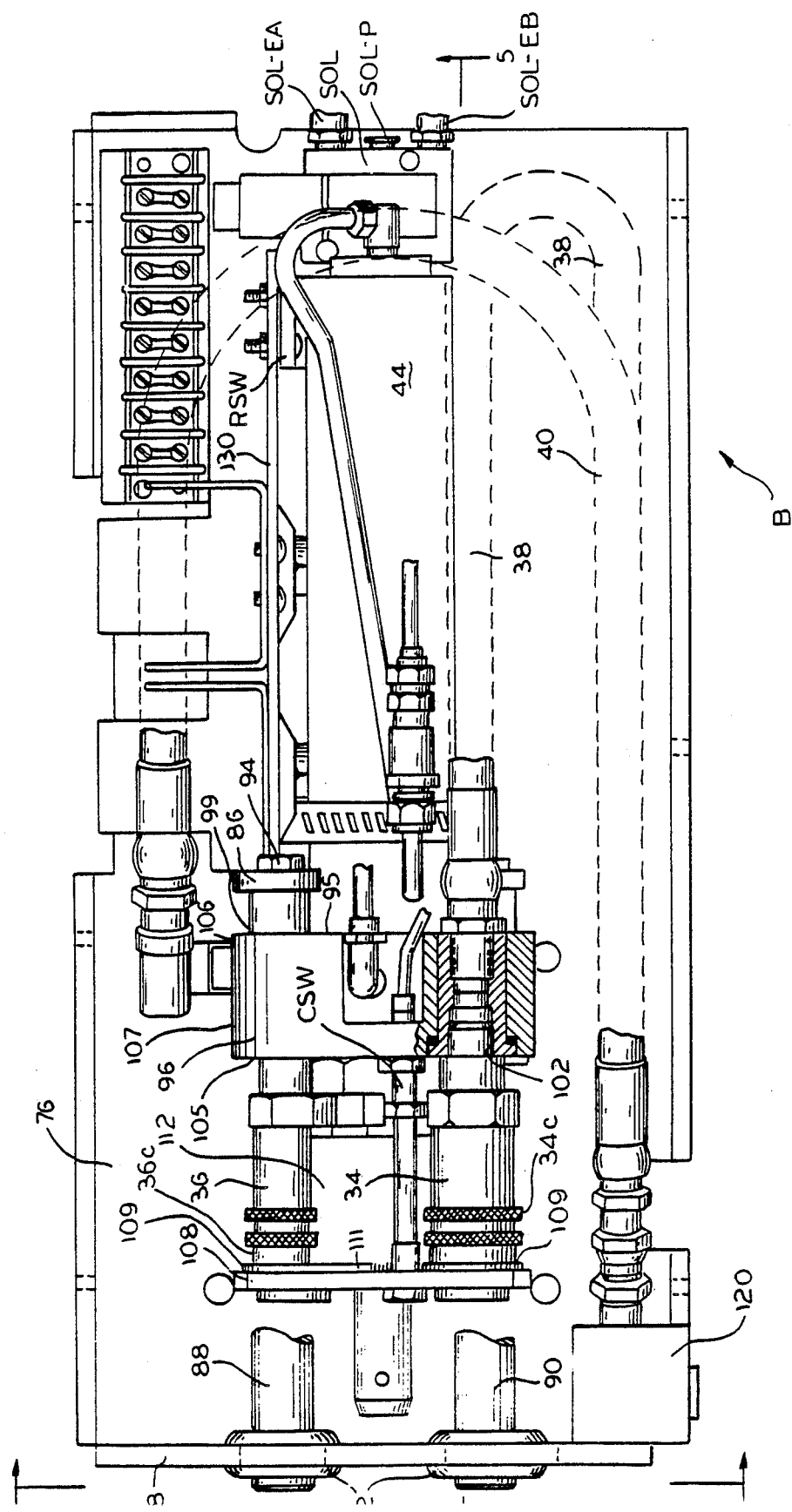
FIG. 4 is a plan view of the base unit of FIG. 2 with a housing cover removed.
Figure 5:
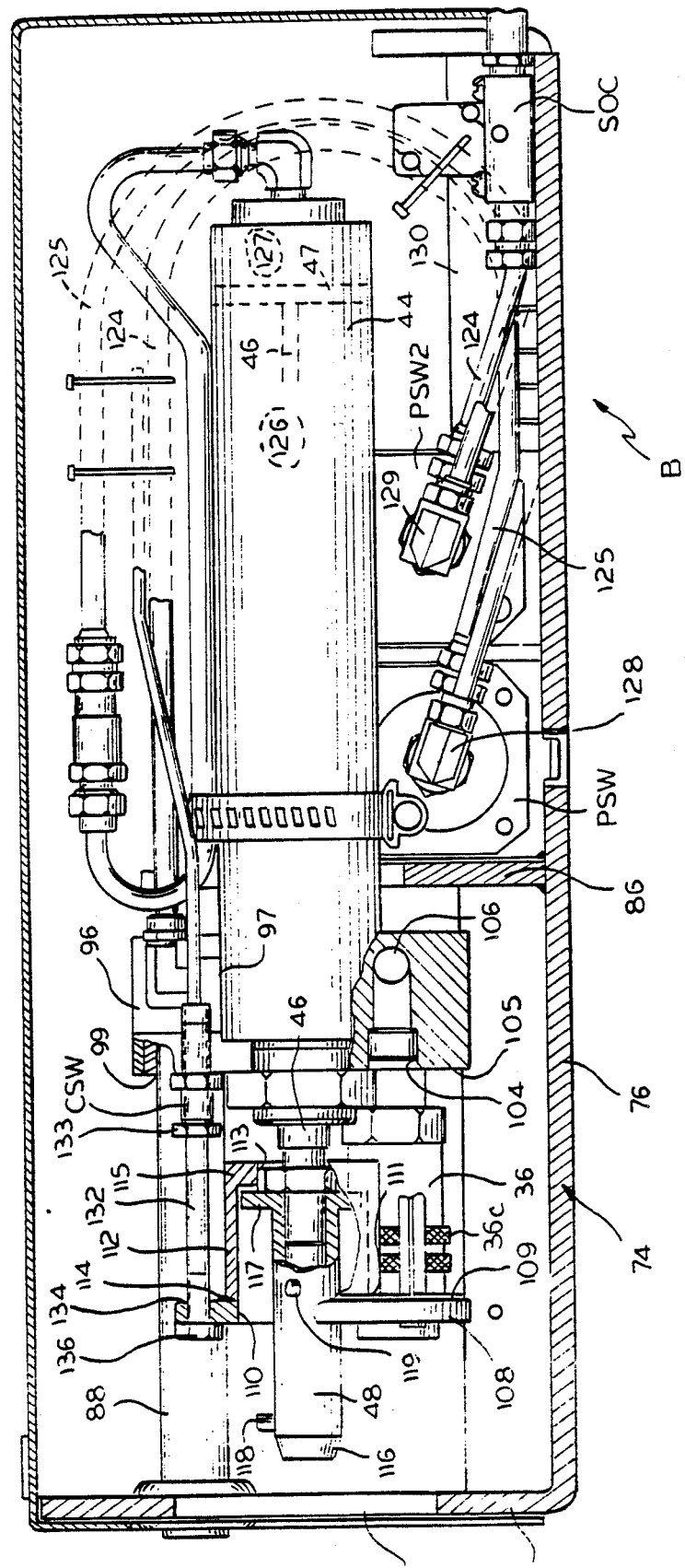
FIG. 5 is a sectional view taken along the lines 5—5 of FIG. 4.
Figure 6:
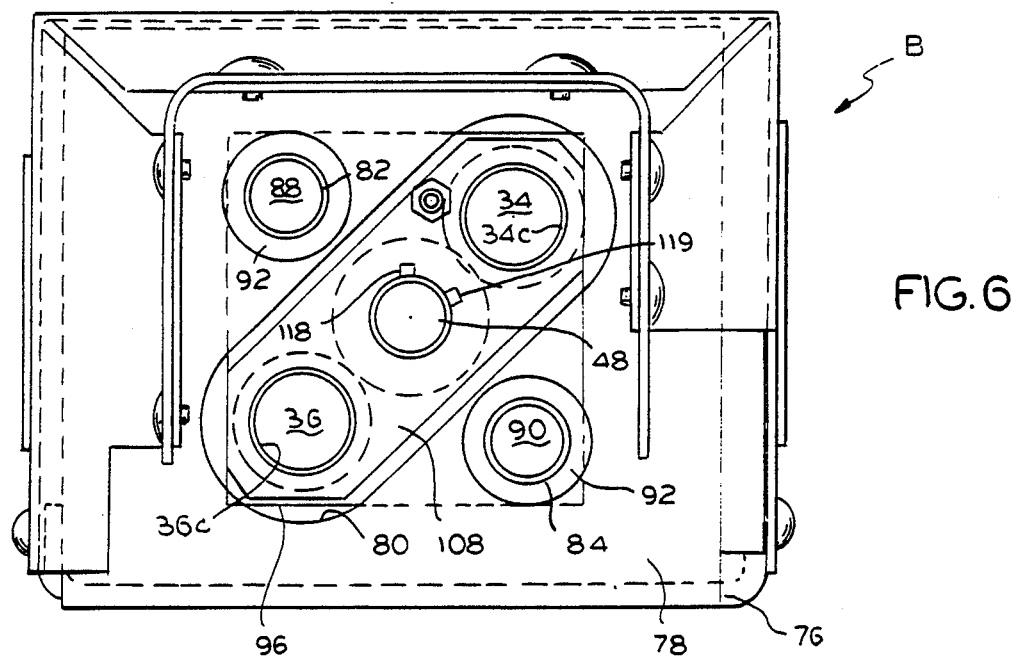
FIG. 6 is an elevational view taken along the lines 6—6 of FIG. 4.

With reference to FIGS. 4-6, the base unit B includes an elongated frame 74 having a bottom wall 76 and a front wall 78. The front wall includes a diagonally oriented oval opening 80 therethrough. Additionally, circular apertures 82 and 84 are provided diagonally opposite one another on opposite sides of the oval opening 80. A support bracket 86 is mounted as by welding to to the bottom wall 76, parallel to the front wall 78 and centrally longitudinally located relative to the bottom wall 76. The bracket 86 is generally L shaped and includes a pair of apertures (not shown) which are in alignment with the circular apertures 82 and 84 in the front wall 78.

Upper and lower slide rods 88 and 90, respectively, are received and supported in the respective front wall apertures 82 and 84 using rubber grommets 92. Inner ends of the rods 88 and 90 are drilled and tapped, and each receives a suitable bolt 94 which extends through the openings in the bracket 86. Resultantly, the slide rods 88 and 90 are mounted in spaced parallel relation with one another as defined by the spacing between the apertures 82 and 84, and similarly 88 and 90.

Figure 6A:
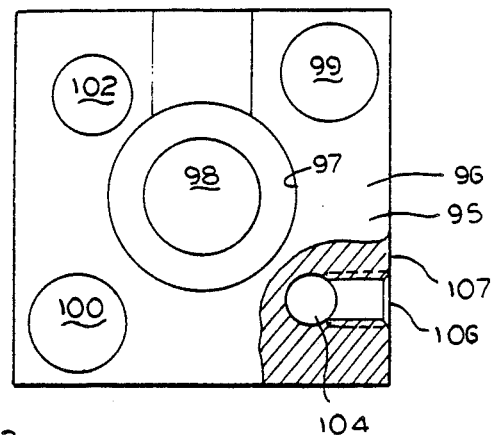
FIG. 6A is a detailed partially cut-away elevational view of a sliding carriage block for the base unit of FIG. 4.

With reference also to FIG. 6A, a square shaped sliding carriage manifold block 96 having front and rear sides 105 and 95, respectively, includes a central bore 97 extending partially therethrough from the rear side 95. A smaller diameter coaxial central bore 98 provides a circular passageway through the block 96. Upper and lower slide bores 99 and 100, respectively, extend through the block 96 adjacent diagonally opposite corners thereof. The slide bores 99 and 100 have a diameter slightly greater than the diameter of the slide rods 88 and 90. A second upper bore 102 extends through the block 96 adjacent the other upper corner thereof. Lastly, a second lower bore 104 diagonally opposite the second upper bore 102 extends partially through the block 96 from the front side 105. The second lower bore 104 is in communication with a side bore 106 through its adjacent side wall 107.

The sliding carriage block 96 is slideably mounted relative to the frame 74 with the respective slide rods 88 and 90 received in the slide bores 99 and 100. Accordingly, the block 96 is slideable longitudinally between the front wall 78 and the bracket 86.

Upper and lower socket half quick couplers 34 and 36, respectively, as shown in FIGS. 1 and 2, are mounted to and extend frontwardly from the respective second bores 102 and 104 of the block 96. The socket collars 34C and 36C are received and retained as by a retaining ring 109 on each collar 34C and 36C being received in a notch 111 in the cup shaped member 112 adjacent the release block 108 in suitable openings provided in a generally oval shaped release block 108. As seen particularly with reference to FIG. 6, the release block is smaller than the oval opening 80 through the front wall 78 and is in alignment therewith. The release block 108 maintains the couplers 34 and 36 in proper spaced and parallel relation.

The double acting air cylinder 44, discussed above relative to FIG. 2, is axially mounted to the sliding block 96 with the rod end thereof received in the partial central bore 97 and the cylinder body extending rearwardly therefrom. Accordingly, the piston rod 46 is extendable through the sliding block central bore 98.

An enlarged central opening 110 is provided through the release block 108 between the couplers 34 and 36. A frontwardly opening cup shaped member 112 is connected to the release block 108 at the opening 110, as by welds 114. A central opening 113 is provided through a bottom wall 115 of the cup shaped member 112. The bore 113 is large enough to permit the piston rod 46 to pass therethrough.

The elongated locking rod 48 is fastened to the piston rod 46 by any known means, such as being threadably received thereon. Accordingly, the locking rod 48 is freely rotatable with the piston 47 and the piston rod 46. The locking rod 48 includes a distal end 116 and an opposite flange end 117. The flange end 117 is larger than the cup bore 113. The locking rod 48 includes a first outwardly extending locking pin 118 adjacent the distal end 116. A second outwardly extending locking pin 119 is provided intermediate the distal end 116 and the flange end 117. The pins 118 and 119 are oriented approximately sixty degrees circumferentially relative to one another.

The hydraulic hoses 38 and 40, discussed above, relative to FIGS. 1-3, are hydraulically connected to the respective couplers 34 and 36 by coupling them to the block 98 at the respective bores 102 and 106 in a conventional manner. The hoses 38 and 40 are also connected to a coupling device 120, see FIG. 4, mounted to the frame bottom wall 76, adjacent the front wall 78, for suitable connection to the pump 42, see FIGS. 1 and 3.

A two position five-way solenoid actuated air valve SOL is mounted at the rear of the frame bottom wall 76. With reference also to the pneumatic schematic of FIG. 7, the air valve SOL includes a pressurized port SOL-P which is connectable to a source 122 of pressurized air or other gas. A pair of opposite exhaust ports SOL-EA and SOL-EB are provided for exhausting air. The air valve SOL includes a pair of respective first and second outlet ports SOL-A and SOL-B. Normally, the pressurized port SOL-P is connected to the first outlet port SOL-A, while the second outlet port SOL-B is connected with the first exhaust port SOL-EA. Conversely, when the valve SOL is energized, the pressurized port SOL-P is connected with the second outlet port SOL-B, while the first outlet port SOL-A is connected to the second exhaust port SOL-EB.

The respective valve outlet ports SOL-A and SOL-B are connected via tubes 124 and 125 to first and second chambers 126 and 127 on either side of the piston 47 of the cylinder 44. Resultantly, when the valve SOL is deenergized, or OFF, the first chamber 126 is under pressure causing the cylinder piston 47 and shaft 46 to be in a retracted position. Similarly, when the valve SOL is energized, or ON, the second chamber 127 is under pressure, and the cylinder piston 47 and shaft 46 are in an extended position.

Figure 13:
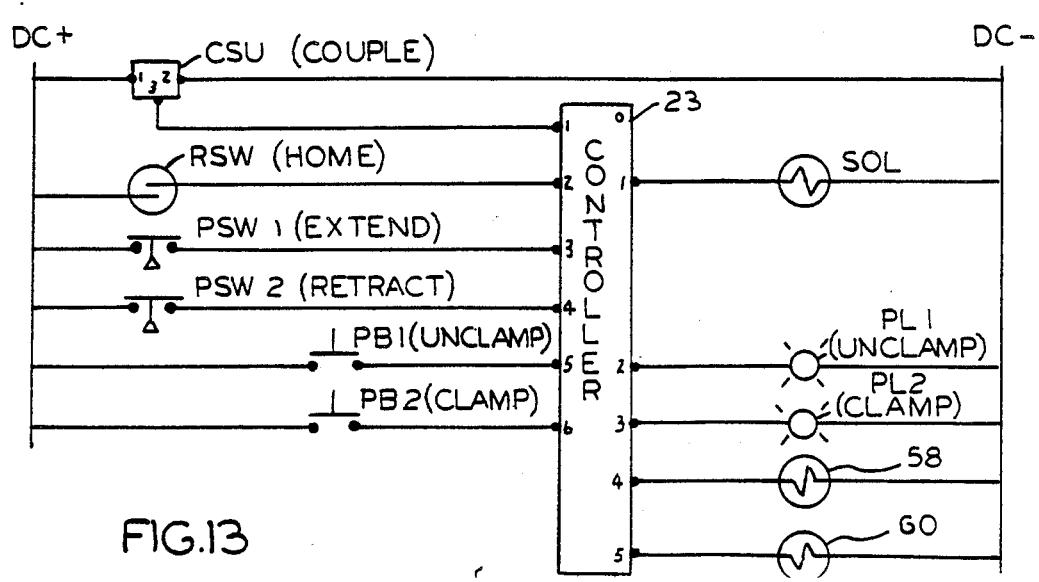
FIG. 13 is an electrical schematic illustrating the control circuitry for the coupling system of FIG. 1.

Respective extend and retract pressure switches PSW1 and PSW2 include normally closed electrical contacts, see FIG. 13. The pressure switches PSW1 and PSW2 are connected via respective T-connectors 128 and 129 to the tubes 125 and 124. Due to the normally closed condition of the electrical contacts, the pressure switches are normally in an ON state in the absence of or at a relatively low sensed pressure. Conversely, when a relatively high pressure is sensed, the pressure switches assume an OFF state, i.e. their associate electrical contact becomes open.

In order to sense when the cylinder 44 is in a home or start position, the cylinder 44 is provided with the piston 47 being made of a magnetic material. A magnetically operable reed switch RSW, see FIG. 4, is mounted to a bracket 130 which is secured to the frame bottom wall 76. The switch RSW includes a normally open contact which closes, i.e., is in the ON state, when the piston 47 is adjacent to the reed switch RSW. The reed switch RSW accordingly senses when the cylinder 44 is in the home position.

A coupling switch CSW is mounted on the sliding block front wall 105 above the cylinder 44. The coupler switch CSW is an inductive type proximity sensor operable to sense a ferrous metal material spaced approximately 0.08 inches away. An elongated screw 132 made of a ferrous metal material passes through an opening 134 in the release block 108 in alignment with the coupler switch CSW. The screw 132 is connected using a nut 136. The screw 136 is fastened to the release block 108 so that a head 133 thereof is normally spaced from the coupler switch CSW less than 0.08 inches so that the coupling switch CSW is normally in an ON state. When the quick socket couplers 34 and 36 are coupled to mating plug couplers 30 and 32, respectively, as discussed below, the collars of the socket couplers 34 and 36 are moved frontwardly away from the sliding block 96.

As discussed above, the release block 108 retains the socket coupler collars 34C and 36C. The coupling action between the first socket coupler 34 and the first plug coupler 30, as well as between the second socket coupler 36 and the second plug coupler 32, causes the collars 34C and 36C to move axially toward the plug couplers 30 and 32, respectively. Such movement of the collars 34C and 36C causes corresponding movement of the release block 108 and thus the screw 132, thus moving the screw 132 further away from the collar switch CSW so that the coupler switch CSW is in the OFF state. Accordingly, the coupler switch CSW is operable to sense when the coupling system 22 is in a coupled state.

With reference to FIG. 13, an electrical schematic illustrates control circuitry for operating the coupling system 22. In the preferred embodiment, the controller 23 comprises a programmable logic controller such as the Gould Model PC-0085 or equivalent which is powered from a source of 120 AC power and includes a plurality of input and output terminals or channels. The controller 23 includes a memory for storing a program to operate the coupling system 22. Flow charts particularly illustrating the operation of a program according to the preferred embodiment of the invention will be discussed relative to FIGS. 14 and 15.

The coupling switch CSW includes power terminals 1 and 2 connected to the DC+ and DC− terminals of a source of DC power. A coupler switch output terminal 3 is connected to an input terminal 1 of the controller 23. Additionally, each of the reed switch RSW, the pressure switches PSW1 and PSW2, and the push buttons PB1 and PB2 are connected between the DC+ terminal and respective input terminals 2-6 of the controller 23. Output terminals 1-5 of the controller 23 are respectively connected to the air valve SOL, the pilot lights PL1 and PL2, and the pilot valve solenoid 58 and 60, each of which has its other side connected to the DC− terminal.

With reference to FIG. 8, the pallet P includes a pallet coupling unit 136. The pallet coupling unit 136 includes a manifold block 138 having an outer side 139. The block 138 is partially surrounded by a U-Shaped protective guard 140 mounted thereto. Quick plug couplers 30 and 32, previously discussed relative to FIGS. 1-3, are mounted to suitable bores (not shown) through the manifold body 138 thereof. The plug couplers 30 and 32 are in parallel spaced relation, similar to that for the quick socket couplers 34 and 36 discussed relative to the base unit B. As discussed with reference to FIG. 3 the couplers 30 and 32 are in hydraulic communication with the respective hoses 62 and 64, connected to the check valve 66.

The cam ring 50 is mounted to the manifold outerside 139 using suitable fasteners 142 which pass through openings in a flange 144. The cam ring 50 includes a cylindrical portion 146 extending outwardly from the flange 144 and defining a central opening 148 having an inner wall 150. The central opening 148 has a diameter larger than that of the base unit locking rod 48.

First, second and third helical cam portions 151-153, respectively, each comprising a partial inner circumferential wall is integrally formed with the cylinder inner wall 150. The cam ring is illustrated in greater detail in FIGS. 9-11. Specifically, FIG. 9 is an elevational view looking from an outer side thereof, FIG. 9A is a plan view taken along the lines 9A—9A of FIG. 9, FIG. 10 is an elevational view taken along the lines 10—10 of FIG. 9A and is looking from the inner side thereof. FIG. 11 is provided for convenience and illustrates the three cam portions 151-153 removed from the cam ring inner wall 150 and rolled out flat.

Each of the cam portions 151-153 when flattened out is trapezoidal shaped, having inner and outer ramp surfaces, indicated by the respective suffixes —IR and —OR, which diverge from an interconnecting short side axial wall surface, indicated by the suffix SW, to an interconnected long side axial surface, indicated by the suffix LW. For example, relative to the first cam portion 151, the inner ramp, outer ramp surfaces are respectively referred to with reference numerals 151-IR and 151-OR, while the short side and long side wall surfaces are indicated by the respective reference numerals 151-SW and 151-LW. Relative to the view of FIG. 11, consecutive cam portions are sequentially positioned in similar orientation so that the short wall portion of any cam portion is facing the long wall portion of the adjacent cam portion. Also, the third cam portion outer ramp surface 153-OR includes a lead-in ramp 157 to accommodate any unplanned rotation of the locking rod 48 during the first cycle stroke.

A circumferential spacing, defining an axial groove 154, is provided between the first cam long axial wall surface 151-LW and the second cam short axial wall surface 152-SW. Similar spacing, defining a second axial groove 155 is provided between the third cam long axial wall surface 153-LW and the first cam short axial wall surface 151-SW. Spacing of the grooves 154 and 155 is sufficient to permit the locking rod pins 118 and 119 to traverse therethrough. Although the second cam long axial wall surface 152-LW and the third cam short axial wall surface 153-SW are similarly spaced, these respective wall surfaces are interconnected with a wall portion 156.

Each of cam portions 151-153 is of similar size except for the lead in portion 157 (FIGS. 9 & 11). Also, each is spaced an equal distance from the others so that any radial position on one cam portion is spaced 120 degrees relative to the axis of the central opening 148 to a similar radial position on any other cam portion.

When it is desired to provide for hydraulic communication between the pump 42 and fixture 26, the base unit B and pallet P must be positioned proximate one another such that the locking rod 48 is in axial alignment with the cam ring 50, and the socket couplers 34 and 36 are in axial alignment with the respective plug couplers 30 and 32. Such an arrangement is illustrated generally in FIGS. 1 and 2.

As is discussed in greater detail below, selective extension and retraction of the cylinder shaft 46 causes the locking rod 48 to pass inwardly and outwardly through the cam ring central opening 148, with the locking pins 118 and 119 selectively engaging the helical cam portions 151-153. Such engagement causes rotation of the locking rod 48, due to the rotatability of the piston 47, which permits controlled coupling and uncoupling of the matable coupler pairs, namely the first coupler pair 30 and 34 and the second coupler pair 32 and 36.

With reference to FIGS. 12A-12F, the stepwise engagement between the locking rod 48 and the cam ring 50 is sequentially illustrated. The view in each illustration is from the inner side of the cam ring, as in FIG. 10. Specifically, such a view would be provided looking from left to right in either FIG. 1 or FIG. 2.

Figure 12A:
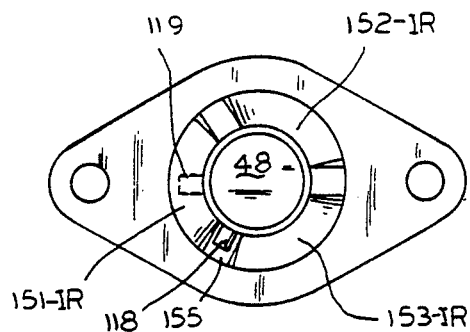
FIGS. 12A–12F sequentially illustrate the respective relative positions of a locking rod and cam ring at various times in the sequence of control operation.

With specific reference to FIG. 12A, a starting position is illustrated. The start position is provided with the cylinder 44 fully retracted and in the home position so that the locking rod 48 is axially spaced from the cam ring 50. Also, the first locking pin 118 is in circumferential alignment with the second axial groove 155, while the second locking pin 119 is circumferentially positioned outwardly from the first cam outer ramp surface 151-OR. (In FIGS. 12A through 12F the locking pins are illustrated in solid line when visible from the inner side of the cam ring 50, and are illustrated in phantom when they on the outerside of the cam ring 50 and not visible from the inner side.) The remaining FIGS. 12B-12F are discussed below relative to the sequence of operation of the coupling system 22.

Figure 14A:
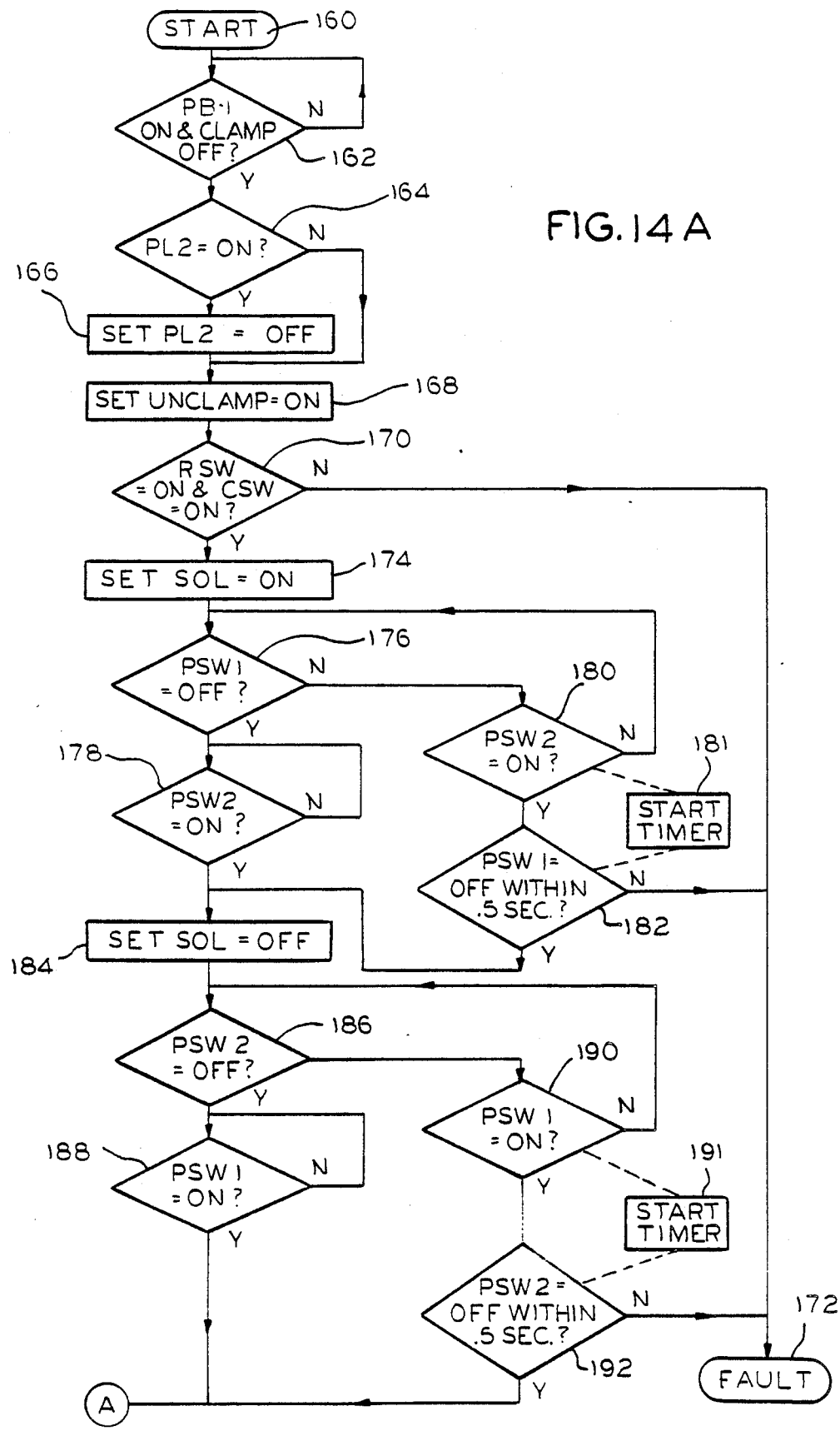
FIGS. 14A and 14B illustrate a flow diagram representing the operation of the controller of FIG. 13 for a couple/unclamp operation.
Figure 14B:
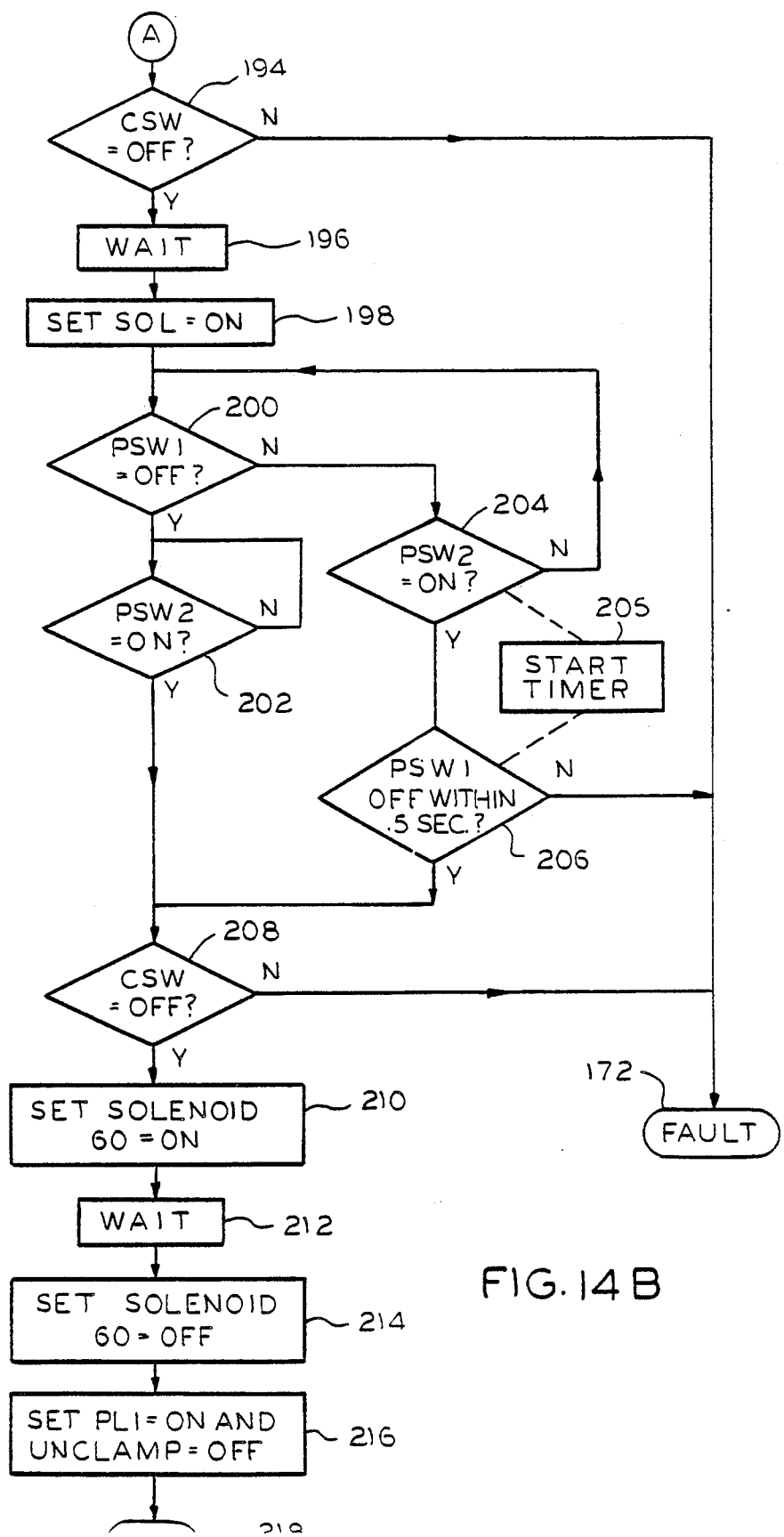

With reference to FIGS. 14A and 14B, a flow diagram illustrates the operation of the controller 23 under the control of a stored program for a coupling/unclamping operation. The operation begins at a start block 160 at which time the base unit B is in axial alignment with the pallet unit P, as illustrated in FIG. 2. Moreover, the locking rod 48 and cam ring 50 are oriented as illustrated in FIG. 12A, with the cylinder 44 in the home position. A decision block 162 determines whether or not the pushbutton PB1 is actuated, indicating that the unclamp operation has been selected, and if a CLAMP register is in the OFF state. If both conditions are not satisfied then the couple/unclamp operation is not performed. If the push button PB1 has been actuated, and the clamp operation is in the OFF state, indicating that the clamp/uncouple operation discussed below is not being performed, then a decision block 164 determines whether or not the clamp pilot light PL2 is energized. If the pilot light PL2 is energized, then the pilot light PL2 is deenergized at a block 166. In either case, control then advances to a block 168 where a register entitled UNCLAMP is set to the ON state. When this is done, the clamp/uncouple operation, discussed below, cannot be initiated.

Figure 12B:
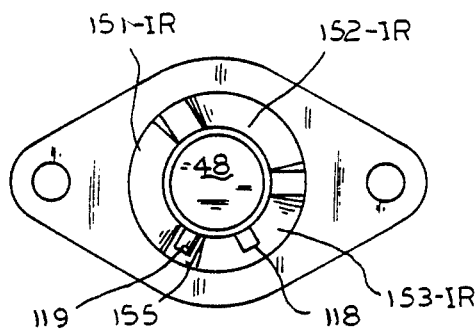
Figure 12C:
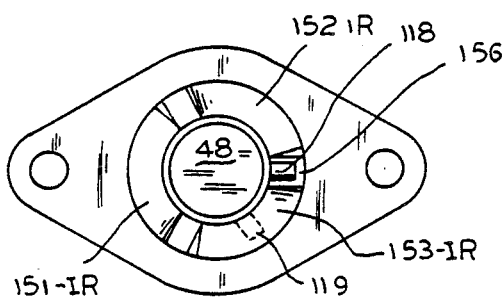

A decision block 170 determines whether or not the reed switch RSW and the coupler switch CSW are both in the ON state, indicating that the base unit B is in the home position. If not, then the system goes into a fault condition at block 172 which is operable to shut down the system. If, however, it is determined at the decision block 170 that the base unit B is in the home position, then the air valve SOL is set to on at a block 174 to provide pressure in the cylinder second chamber 127, to cause extension of the cylinder shaft 46 and thus the locking rod 48. As the locking rod 48 advances in the axial frontward direction, it passes inwardly through the cam ring central opening 148. At the same time, the first pin 118 passes through the second axial groove 155 between the first and third cam portions 151 and 153, respectively. As the locking rod 48 advances further, the second pin engages the first cam outer ramp surface 151-OR causing the locking rod to rotate in the counter-clockwise direction, as viewed from the inner side of the pallet P. The cylinder stops extending with the locking rod flange 117 engaging the cam outer cylindrical portion 146, and the pins 118 and 119 displaced 60 degrees from the start position, as illustrated in FIG. 12B. Accordingly, the locking rod 48 is at rest, the second locking pin is positioned in the axial groove 155, and the first locking rod 118 is positioned axially inwardly from the third cam inner ramp surface 153-IR.

In order to determine when extension is complete, a decision block 176 determines whether or not the extend pressure switch PSW1 is OFF, indicating a high pressure condition. If the pressure switch PS1 is OFF, then control waits at a decision block 178 for the retract pressure switch PSW2 to turn on, indicating a low pressure condition caused by the cylinder 44 completing its extension, before advancing to a block 184. If it is determined that the extend pressure switch is not OFF at block 176, then control advances to a decision block 180 where it is determined whether or not the retract pressure switch PSW2 is on. If the pressure switch PSW2 is not on, then control returns to the decision block 176. If it is determined that the retract pressure switch PSW2 is on, then a timer is started at a block 181 and a decision block 182 determines whether or not the extend pressure switch PSW1 is turned OFF within a half a second. If the pressure switch PSW1 is turned OFF within half a second, then control advances to the block 184 whereat the air valve SOL is turned OFF. Otherwise, the system advances to a block 172 where it goes into the fault condition mode.

When the air valve SOL is set to OFF at the block 184, air pressure is applied to the first chamber 126 of the cylinder 44, causing the locking rod 48 to retract. As the locking rod retracts, the second locking pin 119 moves axially outwardly through the groove 155 and the first locking pin 118 engages the third cam inner ramp surface 153-IR causing the locking rod 48 to rotate another 60 degrees in the counter-clockwise direction until it engages the axial wall portion 156, see FIG. 12C, preventing further axial movement of the locking rod 48. Since the air valve SOL is off, pressure continues to be applied to the cylinder first chamber 126. However, due to the locking action between pin 118 and the cam ring wall 156, axial movement of the piston 47 is prevented. Nevertheless, since the cylinder 44 is itself axially movable due to its being mounted on the sliding carriage block 96, the pressure in the first chamber causes the cylinder to further retract by causing the sliding block 96 to move along the slide rods 88 and 90 in the axial frontward direction toward the pallet P. Since the socket couplers 34 and 36 are affixed to the sliding block 96, they are movable therewith towards their associated respective plug couplers 30 and 32 mounted to the pallet unit P. Axial movement continues until the first plug coupler and socket coupler 30 and 34, respectively, are coupled, and the second plug coupler 32 and socket coupler 36 are coupled.

With reference to decision block 186, the controller 23 determines whether or not the retract pressure switch is OFF. If so, a decision block 188 then determines whether or not the extend pressure switch PSW1 is on, indicating that the cylinder 44 is fully retracted. Otherwise, if it is determined at the retract pressure switch PSW2 is not OFF, then the decision block 190 determines whether or not the extend pressure switch PSW1 is on and if not, control returns to the decision block 186. If it is determined that decision block 190 that the extend pressure switch PSW1 is on, then a timer is started at block 191 and control advances to a decision block 192 where it is determined if the retract pressure switch PSW2 is OFF within a half a second. If not, control advances to the fault block 172. If the retract pressure switch is OFF within a half a second, as determined at the decision block 192, or the extend pressure switch is determined to be on at the decision block 188, then control advances to a decision block 194 to determine whether or not the coupler switch CSW is OFF.

Figure 12D:
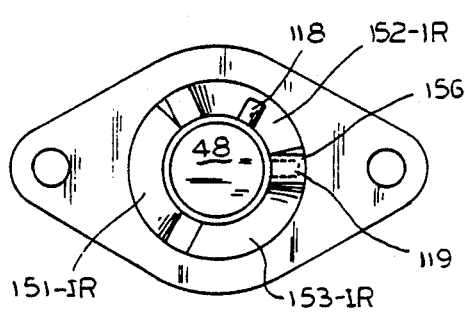

As discussed above, the coupler switch is OFF when the couplers are coupled to one another. If the coupler switch CSW is not OFF, indicating that the a coupling has not been achieved, then control advances to the fault block 172. If the coupler switch CSW is determined at block 194 to be in the OFF state, then control waits for a predetermined period of time at a block 196. Subsequently, the air valve SOL is set to the ON state at a block 198. Energizing the air valve SOL pressurizes the second chamber 127 to cause the locking rod 48 to extend. Extension causes the second locking pin 119 to engage the third cam outer ramp surface 153-OR causing the locking rod 48 to rotate an additional 60 degrees in the counter-clockwise direction, until the second locking pin 119 engages the cam ring wall portion 156 at the outer side, as illustrated in FIG. 12D. This latter extension of the locking rod 48 releases any compressional forces on the couplers caused by engagement of the locking rod 48 and the cam ring 50, previously illustrated with respect to FIG. 12C.

Subsequent to the air valve SOL being set on at block 198, control determines whether or not to extend the pressure switch PSW1 as in the OFF state and the retract pressure switch is in the ON state. This control is implemented by blocks 200, 202, 204, 205 and 206, which blocks are similar in function to respective blocks 176, 178, 180, 181 and 182, discussed above and will therefore not be discussed in detail. Thereafter, a decision block 208 determines whether or not the coupler switch CSW is still in the OFF state, assuring that extension of the cylinder 44 has not caused uncoupling. If the couplers have become uncoupled, then control advances to the fault block 172. If the couplers remain coupled, then the second electrical solenoid 60 is set to the ON state at a block 210. As discussed relative to FIG. 3 above, with the second solenoid 60 energized, hydraulic fluid from the pump 42 is pumped through the second hydraulic hose 40 through the second socket coupler 36 and mated second plug coupler 32 to the second port 68 of the check valve 66, causing the fixture 26 to release the clamping element 28 permitting the work piece to be changed. Control waits at a block 212 for the unclamping to take place. This wait period could be for a preselected time period, or alternatively, a sensing device; such as pressure switch could be used to determine when the pump has operated to complete the unclamping, as is well known. Thereafter, the second solenoid 60 is set OFF at a block 214, and at a block 216, the unclamp pilot light PL1 is turned on and the UNCLAMP register is set to the OFF state, indicating that the couple/unclamp operation is complete. Control then ends at a block 218.

Figure 15A:
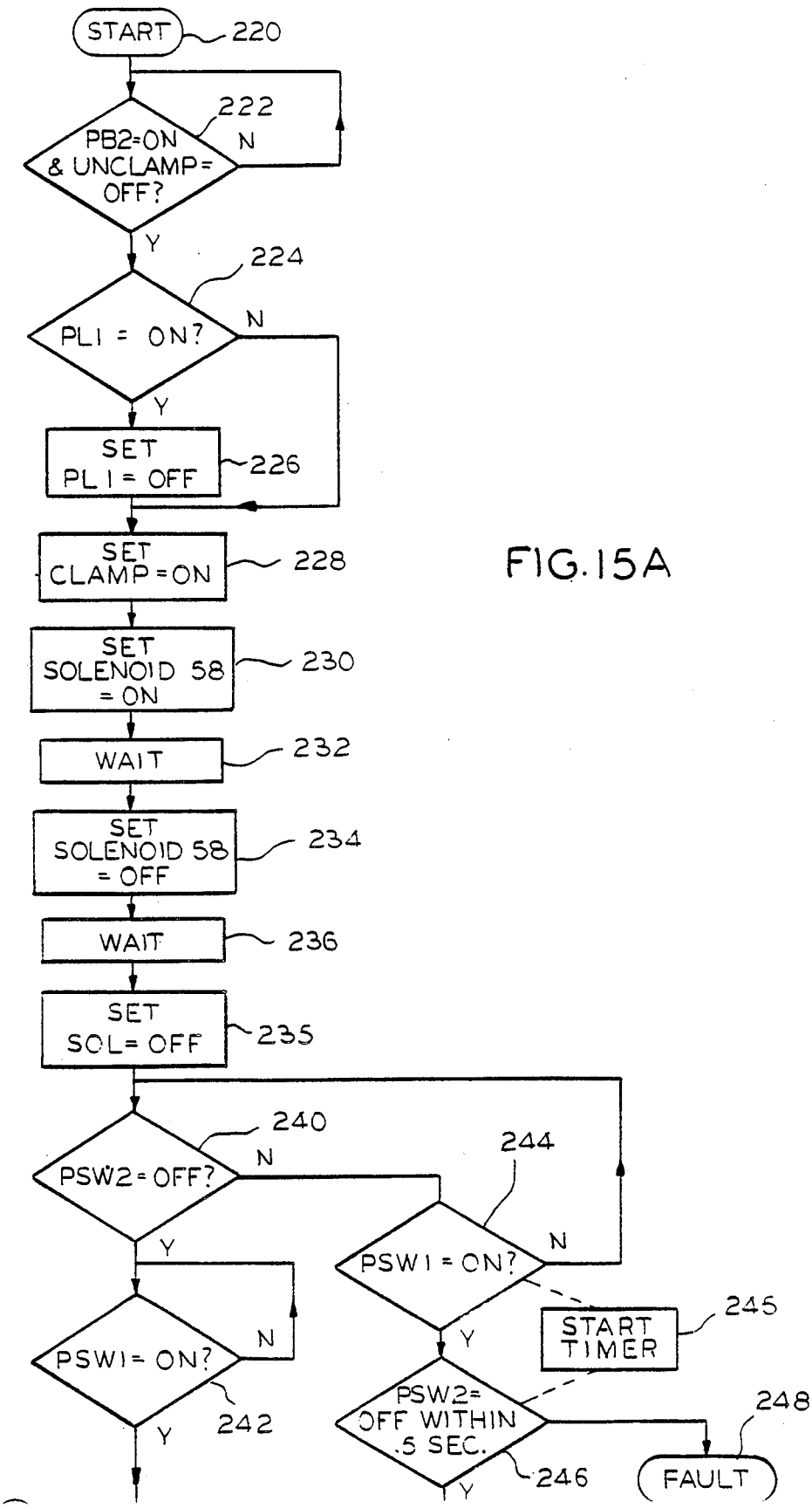
FIGS. 15A and 15B illustrate a flow diagram representing the operation of the controller of FIG. 13 for a clamp/uncouple operation.
Figure 15B:
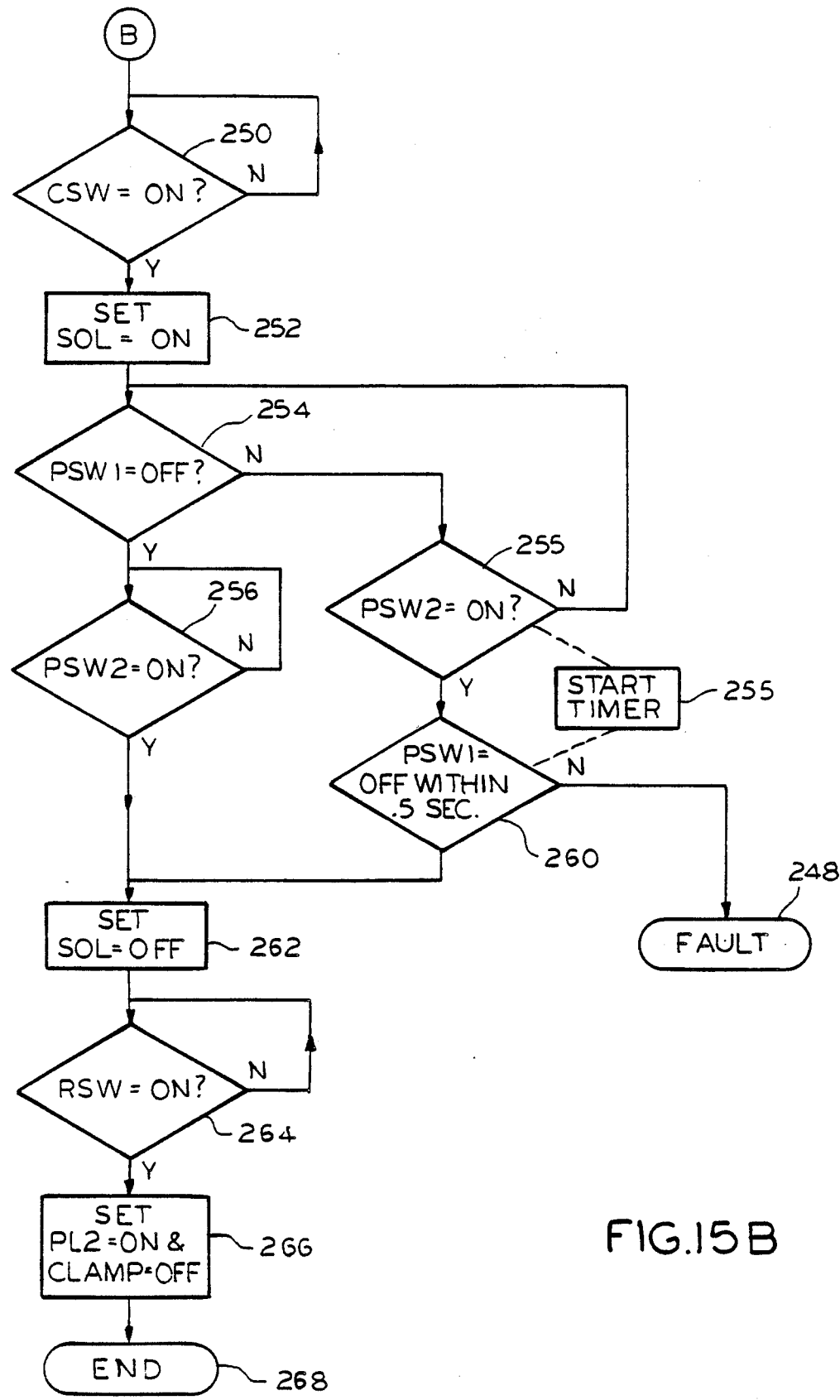

Subsequently, after a new work piece W has been placed on the pallet unit P, it is necessary to commence a clamp/uncouple operation which is operable to lock a work piece W in place on the pallet P and to uncouple the base unit B therefrom. A flow diagram illustrated in FIGS. 15A and 15B represents the operation of a program for the controller 23 to perform this operation.

The clamp/uncouple operation commences at a start block 220. Subsequently, a decision block 222 determines whether or not the clamping operation has been selected by actuating the clamp push-button PB2 and also determines whether or not the UNCLAMP register is in the OFF state indicating that the controller 23 is not performing the couple/unclamp operation discussed above relative to FIGS. 14A and 14B. If both conditions are not satisfied, then the clamp/uncouple operation is not performed. If, however, it is determined that the clamp push button PB2 has been actuated, and the unclamp register is in the OFF state, then a decision block 224 determines whether or not the unclamp pilot light PL1 is in the ON state, indicating the unclamp operation has been completed. If the unclamp pilot light PL1 is on, then the light is set to the OFF state at a block 226. In either case, control then advances to a block 228 which sets the CLAMP register to the ON state.

The clamp/uncouple operation is normally requested only upon completion of the couple/unclamp operation. Accordingly, the respective coupler pairs 30 and 34, and 32 and 36, should be in a coupled state. Therefore, although no such logic is illustrated, to assure the system is in the coupled state, suitable logic could be included at this point in the operation to ensure that coupling has been achieved as is obvious to those skilled in the art.

At a block 230 the first solenoid 58 is set to the ON state for a period of time determined by the wait at the block 232. When the first solenoid 58 is energized, as previously discussed relative to FIG. 3, the hydraulic pump 42 is coupled through the first hydraulic hose 38, the first socket coupler 34, the first plug coupler 30 and first pallet unit hydraulic hose 62 to the first port 67 of the check valve 66, causing the cylinder 72 to be under pressure resulting in the clamping element 28 locking the work piece W in position, as illustrated in FIG. 2. After a wait at block 232, similar to the wait block 212, above, the first solenoid 58 is turned OFl at a block 234. However, due to the operation of the check valve 66, the fixture 26 remains in the clamped state locking the work piece W to the pallet so that an operation can subsequently be performed thereon.

Figure 12E:
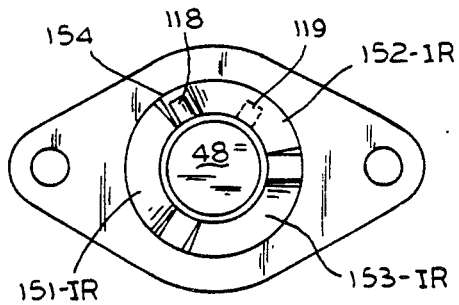

Once the new work piece W has been locked in place, it is necessary to uncouple the base from the pallet unit P. Accordingly, after a delay at a wait block 236, the air valve SOL is set to OFF at a block 238. Setting the air valve SOL OFF causes the cylinder 44 to retract. As the locking rod 48 is retracted, the first pin 118 engages the second cam inner ramp surface 152-IR causing the locking rod 48 to rotate an additional 60 degrees in the counter-clockwise direction resulting in first locking pin 118 being in alignment with the first axial groove 154, as illustrated in FIG. 12E. Upon continued retraction of the locking rod 48, the locking rod 48 moves outwardly from the cam ring central opening 148 and is drawn back rearwardly towards the base unit B until the locking rod flange 117 engages the release bracket cup portion rear wall 115. The flange 117 thus forces the release bracket 108, and thus the socket coupler collars rearwardly, causing the first socket coupler 34 to uncouple from the first plug coupler 30. Similarly, the second socket coupler 36 is uncoupled from the second plug coupler 32. Thereafter, decision blocks 240, 242, 244, 245 and 246 operate similarly to respective blocks 186, 188, 190, 191 and 192 discussed above relative to FIG. 14A, to assure that the retract pressure switch PSW2 is in the OFF state and the extend pressure switch is in the ON state indicating that piston 47 is fully retracted in the cylinder 44. Otherwise, the control enters a fault condition at block 248 to shut the system down.

Figure 7:
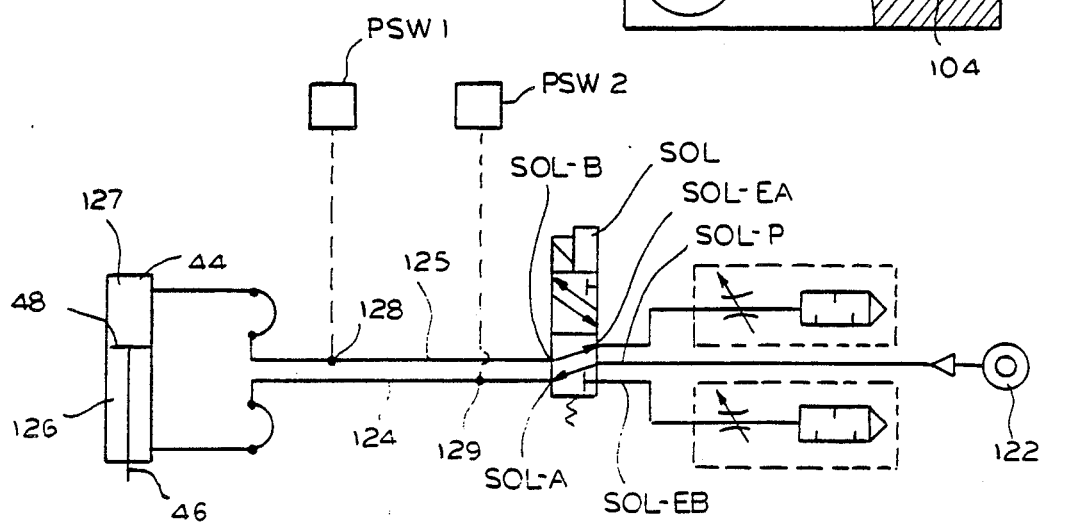
FIG. 7 is a fluidic control schematic illustrating the interconnection of the components of the base unit of FIG. 4.
Figure 12F:
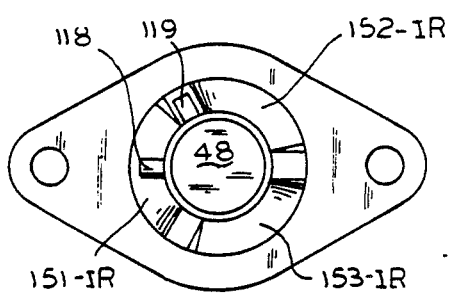

If it is determined that the cylinder 44 has properly retracted, then a decision block 250 determines whether or not the coupler switch CSW is in the ON state, indicating that the couplers have in fact become uncoupled, as discussed above. Control waits at decision block 250 until the coupler switch CSW is on. After the coupler switch CSW is on, then the air valve SOL is set on at a block 252 to extend the cylinder. Extension of the cylinder causes the locking rod 48 to again advance inwardly through the cam ring central opening 148 with the second locking pin 119 engaging the second cam outer ramp surface 152-OR, causing the locking rod 48 to rotate an additional 60 degrees in the counter-clockwise direction, resulting in the second locking pin 119 entering the second axial groove 154, as illustrated in FIG. 12F. However, the locking rod flange 117 engages the cam ring cylindrical portion 146 which prevents further movement of the locking rod 48. Nevertheless, since air pressure is still applied to the second chamber 127, as illustrated in FIG. 7, the cylinder 44 itself continues to extend causing the sliding carriage block 96 to move longitudinally rearwardly on the slide rods 88 and 90. Thus, the socket couplers 34 and 36 are moved axially away from their associated plug couplers 30 and 32, respectively.

Thereafter, decision blocks 254, 256, 258, 259 and 260 operate in a similar manner as respective blocks 176, 178, 180, 181 and 182 of FIG. 14A to ensure that the cylinder 44 is fully extended. If the cylinder does not fully extend, then the system advances to the fault block 248. If it is determined that the cylinder 44 is fully extended, then air valve SOL is set OFF at a block 262, causing the cylinder 44 to retract. Retraction of the cylinder 44 causes the second locking pin 118 to pass outwardly through the first axial groove 154 and the first locking pin 119 to subsequently engage the first inner ramp surface 151-IR to rotate the locking rod an additional 60 degrees, resulting in the first locking pin 118 passing outwardly through the second axial groove 155 as illustrated in FIG. 12A. The locking rod 48 thereafter advances outwardly through the cam ring central opening 148 and is drawn back rearwardly into the base unit B. Control at a decision block 264 waits for the reed switch RSW to be in the ON state, indicating that magnetic piston 47 is in the fully retracted home position.

Once the reed switch has been turned on, as determined at the decision block 264, then the clamp pilot light PL2 is set on and the CLAMP register is set OFF at a block 266 and the clamp/uncouple operation is ended at a block 268. The base unit B is then operable to perform a subsequent coupling and uncoupling operation on any associated pallet unit P.

As discussed above, the programmed controller 23 is operable in conjunction with its respective input and output devices to reciprocate the locking rod 48 whereby the reciprocal movement enables the locking rod 48 to pass inwardly and outwardly with respect to the cam ring central opening 148. Engagement of the locking pins 118 and 119 with cam portions 151-153 causes selective rotation of the locking rod 48 which results in selective engagement between the pins 118 and 119 and cam ring 50 to move the socket couplers 34 and 36 towards or away from the plug couplers 30 and 32 to respectively couple or uncouple same, in an automatic and controlled manner.

A coupling system according to the present invention could also be utilized to couple other type of matable devices, such as electrical plugs and sockets, or the like, a base unit and a remotely located satellite unit.

The present invention thus broadly comprehends use of a single dual acting cylinder to automatically couple and uncouple suitable coupling devices.

I claim:

1. In a system including a base unit having a first connector and a satellite unit having a second connector connectable with said first connector, an apparatus for automatically connecting said first and second connectors comprising:
   a cam ring having a central axial opening surrounded by a plurality of helical cam portions;
   mounting means for mounting said cam ring to said satellite unit in spaced parallel relation with said second connector;
   an elongated locking rod having a diameter smaller than the diameter of said central opening and a plurality of radially outwardly extending and axially spaced locking pins;
   actuable means connected to said locking rod for providing axial and rotational movement thereof;
   carriage means for axially slideably mounting said first connector and said actuable means to said base unit so that said locking rod and said first connector are in spaced parallel relation similar to the spacing provided by said mounting means; and
   control means connected to said actuable means for sequentially reciprocally axially moving said locking rod whereby said reciprocal movement causes said rod to selectively pass inwardly and outwardly through said axial opening so that said pin selectively engage said cam portions to rotate said locking rod and to thereby controllably slideably move said carriage means toward or away from said satellite unit to connect or disconnect said first and second connectors.

2. The apparatus of claim 1 wherein said actuable means comprises a dual acting cylinder having a rotatable piston therein defining first and second pressure chambers, and said control means sequentially alternately pressurize said first and second chambers.

3. The apparatus of claim 1 wherein said cam ring central opening defines an inner wall having said helical cam portions circumferentially formed thereon, said cam portions including inner and outer ramp surfaces whereby said rod passing inwardly and outwardly through said opening causes said pins to engage said ramp surfaces to rotate said locking rod.

4. The apparatus of claim 3 wherein at least two of said cam portions are spaced from one another defining an axial groove and a wall portion is provided interconnecting at least two of said cam portions, and wherein rotation of said locking rod causes said locking pins to selectively engage said wall portion, said engagement causing said actuable means to slideably move said carriage means to selectively connect said connectors.

5. In a hydraulic work holding station including a hydraulically operable fixture for clamping a workpiece, said fixture including an inlet port, a coupling system operable to hydraulically couple the inlet port to a source of hydraulic power, comprising:
- a first coupler device in hydraulic communication with said inlet port;
- a cam ring having a plurality of helical cam portions defining a central axial opening therethrough;
- first mounting means for mounting said first coupler device and said cam ring to said fixture in spaced parallel relation;
- a second coupler device matable with said first coupler device;
- means for coupling said second coupler device to a source of hydraulic power;
- a dual acting cylinder having an axial rotatable piston rod;
- an elongated locking rod axially connected to said piston rod and having a diameter smaller than the diameter of said cam ring central opening and a plurality of outwardly extending and axially and circumferentially spaced locking pins;
- carriage means for mounting said second coupler device and said cylinder in spaced relation identical to the spacing provided by said bracket means;
- a fixture frame;
- second mounting means for mounting said fixture frame in axially spaced relation from said first mounting means and including sliding means for axially slideably mounting said carriage means so that said locking rod and said second coupler device are respectively axially aligned with said cam ring central opening and said first coupler device; and
- control means hydraulically coupled to said cylinder for alternately pressurizing first and second cylinder chambers thereof to reciprocate said locking rod whereby said reciprocal movement causes said locking rod to pass inwardly and outwardly through said cam ring central opening and further causes said locking pins to coact with said helical cam portions to selectively rotate said locking rod to thereby slideably move said carriage means towards or away from said bracket means to controllably couple said first and second coupler devices to hydraulically couple said fixture to the source of hydraulic power.

6. The coupler system of claim 5 wherein said carriage means comprises a manifold block having first and second bores therethrough, and said sliding means comprises parallel spaced slide rods received in said bores for permitting slideable movement of said block thereon.

7. The coupling system of claim 5 further comprising a release block mounted to a release collar of said second coupler device, and including an opening receiving said locking rod, retraction of said rod caused by said cylinder causing one of said locking pins to retract the release block and the release collar to uncouple said second coupler device from said first coupler device.

8. The apparatus o claim 5 wherein said control means comprises a two position spring return four-way solenoid valve connectable to a source of pressurized gas coupled to first and second chambers of said dual acting hydraulic cylinder.

9. The coupling system of claim 8 wherein said control means further comprises a programmed controller device coupled to said solenoid for alternately energizing and deenergizing said solenoid to provide reciprocal movement of said locking rod.

10. The apparatus of claim 9 wherein said control means further comprises pressure switches in communication with said first and second chambers for sensing when said cylinder is in a fully extended or retracted position.

11. In a hydraulic work holding station including a hydraulically operable fixture for clamping a work piece, said fixture including an inlet port, a coupling system operable to hydraulically couple the inlet port to a source of hydraulic power, comprising:
- a pallet unit hydraulically connectable to said inlet port including:
  - a pilot operated check valve including an outlet port, an inlet port and a release port wherein the outlet port is coupleable to said fixture inlet port;
  - first and second quick coupler devices respectively coupled to said check valve inlet port and release port;
  - a cam ring having a plurality of inner circumferential cam portions defining a central axial opening wherein at least two of said cam portions are connected by an interconnected portion; and
  - means for mounting said first and second coupler devices and said cam ring in spaced parallel relation;
- a base unit including:
  - third and fourth quick coupler devices respectively matable with said first and second quick coupler devices;
  - means for coupling said third and fourth coupler devices to a source of bidirectional hydraulic power;
  - a dual acting air cylinder having an axial piston rod coupled to a rotatable piston defining first and second chambers;
  - an elongated locking rod having a diameter smaller than the diameter of said cam ring central opening and a plurality of axially and circumferentially spaced, outwardly extending locking pins, said locking rod being secured at one axial end to said piston rod;
  - carriage means for mounting said third and fourth coupler devices and said cylinder in spaced parallel relation identical to the spacing provided by said pallet unit mounting means;
  - a fixture frame axially spaced from said pallet unit and including sliding means for axially slideably mounting said carriage means so that said locking rod and said third and fourth coupler devices are respectively axially aligned with said cam ring central opening and said first and second coupler devices; and valve means coupled to said cylinder for selectively directing pressurized air to said first and second cylinder chambers; and a sequencing controller coupled to said valve means and including means for operating said valve means to reciprocate said locking rod whereby said reciprocal movement causes said rod to reciprocate through said cam ring opening resulting in said locking pins coacting with said cam portions and said interconnected portion to effect selective rotational movement of said locking rod to produce sliding movement of said carriage means towards or away from said pallet unit to controllably couple and uncouple said first and third coupler devices and said second and fourth coupler devices to provide a hydraulic connection between the source of power and said fixture inlet port.

12. The coupling system of claim 11 wherein said carriage means comprises a manifold block including first and second bores therethrough, and said sliding means comprises parallel spaced slide rods received in said bores for permitting slideable movement of said block thereon.

13. The coupler system of claim 11 further comprising a release block mounted to release collars of said third and fourth quick coupler devices, and including an opening receiving said locking rod, retraction of said locking rod caused by said cylinder causing one of said locking pins to retract the release block and the release collars to uncouple said third and fourth quick coupler devices from said first and second quick coupler devices.

14. The coupling system of claim 11 wherein said sequencing controller comprises a programmable controller device operating under the control of a control program and having an output terminal coupled to said valve means for controlling said valve means to reciprocate said locking rod.

15. An apparatus for interconnecting a base unit to a satellite unit spaced therefrom comprising:

a cam ring having a central axial opening surrounded by a plurality of helical cam portions;

mounting means for mounting said cam ring to said satellite unit;

an elongated connecting rod having a diameter smaller than the diameter of said central opening and a radially outwardly extending locking pin;

actuable means mounted to said base unit and including an actuator connected to said connecting rod for providing axial and rotational movement of said connecting rod; and control means connected to said actuable means for sequentially actuating said actuable means to provide reciprocal axial movement of said connecting rod whereby said reciprocal movement causes said rod to selectively pass inwardly and outwardly through said axial opening so that said pin selectively engages said cam portions to selectively rotate said locking rod to thereby controllably interconnect said base unit to said satellite unit.

16. The apparatus of claim 15 wherein each of said cam ring helical cam portions defines means responsive to axial movement of said locking rod and said locking rod pins for converting axial movement to rotational movement of said locking rod, each of said cam portions being circumferentially spaced for adjacent ones of said cam portions with at least two of said cam portions interconnected by a circumferential wall portion, and wherein said control means operates in a couple mode to axially move the connecting rod inwardly through said opening whereby one of said helical cam portions coacts with said locking pin to provide rotational movement of said rod, and subsequently to provide axial movement of said connecting rod outwardly through said opening whereby one of said cam portions coacts with said locking pin to rotate said connecting rod so that said connecting rod pin engage said circumferential wall portion to prevent further axial movement thereof and thereby interconnect said base unit to said satellite unit, and wherein said control means operates in an uncouple mode to axially move said locking rod outwardly through said central opening so that one of said cam portions engages said locking pin to rotate the locking rod to permit complete outward movement therethrough to disconnect said base unit from said satellite unit.

17. In a system including a base unit having a first connector and a satellite unit having a second connector connectable with said first connector, an apparatus for automatically connecting said first and second connectors comprising:

means for interlocking said base unit to said pallet unit, said interlocking means including first and second locking elements which are lockable with one another;

mounting means for mounting said second locking element to said satellite unit in spaced relation with said second connector;

actuable means rotatably mounting said first locking element and providing for axial movement thereof;

carriage means for axially slideably mounting said first connector and said actuable means to said base unit so that said first locking element and said first connector are in spaced relation similar to the spacing provided by said mounting means; and control means connected to said actuable means for sequentially actuating said actuable means to reciprocally axially move said first locking element whereby said reciprocal movement causes said first locking element to selectively interlock with said second locking element and to controllably slideably move said carriage means towards or away from said satellite unit to connect or disconnect said first and second connectors.

* * * * *